Dec. 4, 1934.  S. W. GRAVES  1,982,912
CONTAINER
Filed Sept. 2, 1933
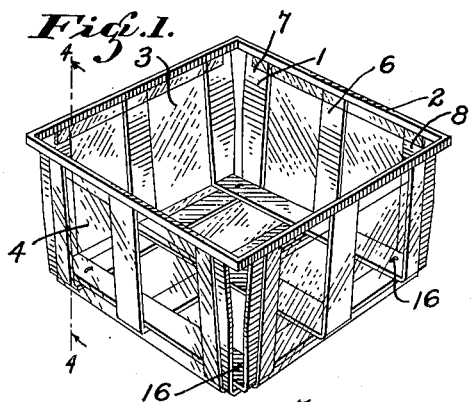
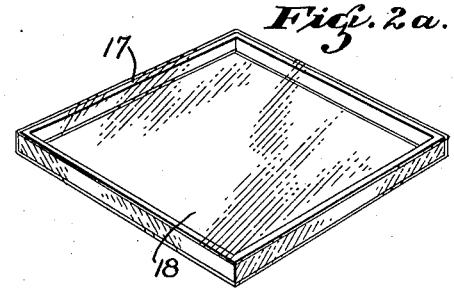
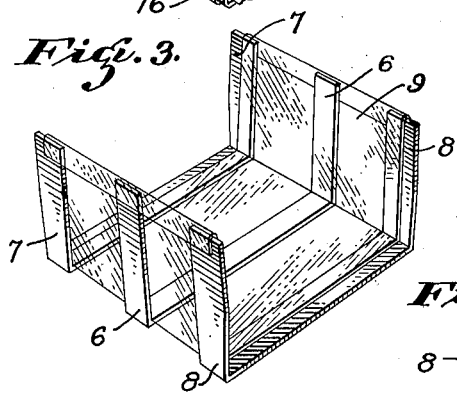
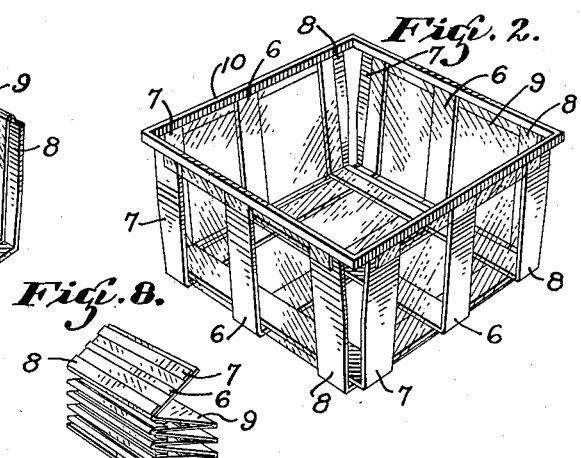
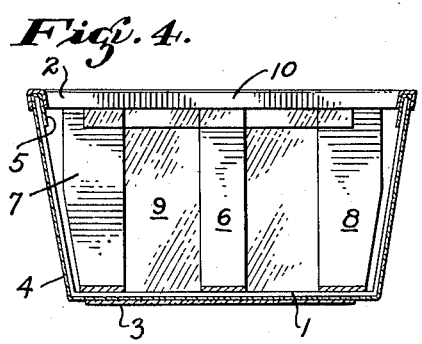
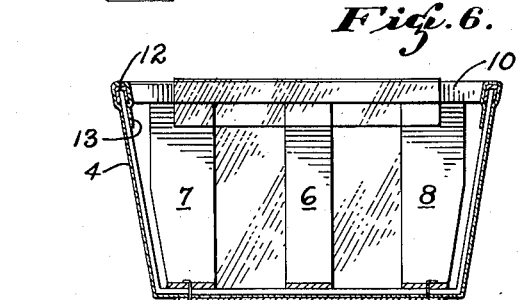
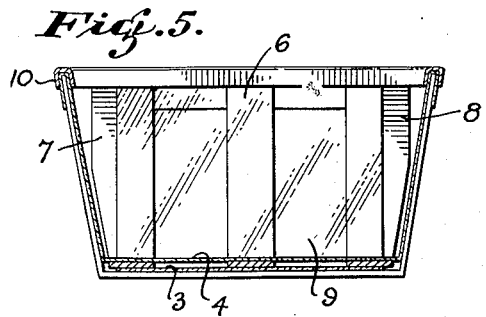
INVENTOR.
SHIRRELL WATSON GRAVES
BY
A. Dunham Oliver
ATTORNEY.

Patented Dec. 4, 1934

1,982,912

UNITED STATES PATENT OFFICE 1,982,912

CONTAINER

Shirrell Watson Graves, San Francisco, Calif.

Application September 2, 1933, Serial No. 687,976

5 Claims. (Cl. 217—122)

This invention relates to an improvement in fruit baskets and similar types of containers.

It has for its purpose, to overcome the many disadvantages associated with the type of container or basket now in use for holding and displaying fruit, berries, etc.

The present type of container is comprised either of thin wood sheets, molded into the form of a basket and held at the top edge by a thin metallic crimped rim; or they are formed from thin wood sheets and folded into the basket shape and stapled together; or they are formed from paper, fibreboard, or other opaque sheet material. This type of basket or container has been in use for many years, and its construction has not varied materially over that period of time.

The type of containers just referred to, have several disadvantages in use. For instance, most customers when buying fruit or berries held in such a container, insist on seeing beneath the top layer. The clerk therefore places his hand over the top of the fruit, inverts the basket, and lets the berries or fruit partially fall out from the basket into his hand. The basket is then turned right side up and the fruit or berries are allowed to shuffle back into the basket. Aside from the sanitary aspect of the fruit coming in contact with the usually unclean hands of a fruit clerk, there is the further important disadvantage of the fruit being bruised and injured, as it is returned into the basket. This latter feature makes it necessary that every night, grocers have to go over their stock of fruit and berries in such baskets, and carefully pick out fruit which has been bruised during the day's handling.

Another disadvantage of the present type of container, is that Government food inspectors, in inspecting fruit or berries, find it difficult to determine thoroughly and carefully, their condition, below the top layer.

Another disadvantage of the present type baskets held together with a tin rim at the top, is that contact of the fruit or berries with this tin rim often causes a staining of the fruit, thereby accelerating its spoiling.

It is the purpose of the present invention to provide a solution of the foregoing problems; to provide a strong, combination wood, fibre, or rigid framework with a transparent covering material, the whole providing a sturdy practical type of container. The transparent covering material used makes possible clear visibility of the fruit or berries, through the windows in the sides and bottom of the container, thereby rendering thorough inspection a simple matter for the Government inspectors, and also making inspection by the purchaser a very simple matter.

A further important advantage is that the grocer is saved labor and loss of considerable percentage of the fruit and berries each day through excessive handling, shuffling or bruising necessarily resulting from use of the present day form of container.

A further object of the invention is to provide a container having provision for covering over the tin binding ring at the top of the container, so that the fruit cannot contact it, and become stained or spoiled.

These objects are obtained by the structures illustrated in the accompanying drawing, in which, Fig. 1 is a perspective view of the basket of the improved type of the invention;

Fig. 2 is a preferred form of basket, and is shown in perspective.

Fig. 2—a is a cover for the basket.

Fig. 3 is a perspective view of one of the U shaped elements used in making the basket of Fig. 2.

Fig. 4 is a cross section taken on the line 4—4 of Fig. 1, showing the manner in which the lattice work is formed, and the transparent material laid thereover.

Fig. 5 is a cross section of the basket shown in Fig. 2; and

Fig. 6 is a cross section of a modified form showing the tin binding rim at the top, completely encased within the transparent sheet material.

Fig. 7 is a roll of transparent covering with the stiffening members in place.

Fig. 8 is like Fig. 7, except the material is folded in a fanfold.

The structure shown in Fig. 1 is comprised of a lattice frame work, 1, held together at the top by a metallic binding ring, 2. This ring 2 may be of other suitable material. In the drawing these parts have been enlarged disproportionately for purposes of clarity in showing structural details. Over the skeleton framework thus provided, is laid the covering of transparent material, 3, and 4.

This covering may be applied either before (see Fig. 4) or after (see Fig. 6) the rim, 2, is applied. Suitable jigs being provided to hold the framework elements, 1, in place while the covering is being applied. The covering may be glued to the framework, or may be held in place by staples 16, (see Figs. 1 and 6) in the bottom four corners, and while the covering may be of one piece, shaped like a Maltese cross, it is preferable to use two strips, 3 and 4, thereby accomplishing a strengthening of the bottom, due to the double thickness of the material. The ends of the material of the covering are looped over the end of the lattice framework and encased within the tin binding rim, 2. This is clearly shown in Figure 4, where the end of the transparent covering terminates at 5, held in place by the rim, 2. Figure 4 also shows the lattice framework, 1, and the application of the covering material, 3 and 4, providing the double thickness for the bottom section.

The basket shown in Fig. 2, the preferred construction differs from the one previously described in that it is composed of U shaped sections, the latter formed of a plurality of stiffening members, 6, 7, 8, spaced apart and attached to a body of transparent sheet material, 9. (See Fig. 3.)

Two of these U shaped members are set together in a crosswise position with the walls extending upwardly, so the four edges can be received within a binding rim, 10. Here again, the construction makes possible the double thickness of transparent material for the bottom.

The transparent material to which are fastened the parallel spaced stiffening members, 6, 7, 8, can be fabricated and stored in rolls, (see Fig. 7) or in fanfold form, (see Fig. 8), and fed into the basket making machine, in a continuous strip. Suitable knives in the machine separate the strips into properly sized sections, and another step in the operation, shapes the severed units into a U shaped section. This only leaves the third step, that of placing together two of the U shaped sections and applying the binding rim, 10.

The modification shown in Figure 6 is a variation of the basket of Fig. 1, in that the clamping rim, 12, is covered entirely by the covering material 4, which is brought up the outside of the lattice work, bent over the rim 12, and secured on the inside of the lattice work at 13. The purpose of this is to provide a covering for the metallic binding rim 12, to prevent it from contacting the fruit or berries contained in the basket. In the actual building and use of these improved containers, it has been found that the product known as "Cellophane" provides a satisfactory product for the transparent covering. The stiffening element can be made, either of very thin wood, fibreboard, celluloid, or other suitable material.

An economy in manufacture can be effected by the use of staples in the bottom four corners of the basket, as illustrated in Figs. 1 and 6 at 16. This eliminates the need of pasting the material to the stiffening member, and speeds up the manufacturing process.

The cover shown in Fig. 2—a is made of a stiffened rim, 17, and the transparent material 18. It is made to fit over the rim 10, 2 of the basket. Grocers and fruit sellers have found it effects a considerable saving, for fruit, etc., on display, cannot be sampled or handled by the customer. It also keeps the contents in place when the basket is inverted to inspect through the bottom and side windows.

While certain features of the present invention are more or less specifically described, it is to be understood that various changes may be resorted to, within the scope of the appended claims. Similarly, that the materials and finish of the several parts employed, may be such as the manufacturer may decide, or varying conditions or uses may demand, to accomplish the purposes of the invention.

Having thus described my invention, what I claim and desire to secure by Letters Patent is,—

1. An open topped sloping walled container with windows in its walls and bottom comprising a soft metal binding rim, a supporting frame consisting of a plurality of U shaped strips, spaced apart to provide openings, and with their ends gripped in said rim, and a transparent material applied thereover to form the bottom and walls of the container and provide windows whereby a partial view of the contents of the container will be visible through the windows in the bottom and side walls.

2. An open topped sloping walled container with windows in its walls and bottom comprising two frame sections each consisting of a plurality of U shaped strips, spaced apart longitudinally to provide long narrow openings and having secured on top of each parallel group of said strips a tough transparent material so that when said frame sections are overlaid on each other with the strips running at right angles they provide a supporting body partially of strips and partially of transparent material and a soft metal binding rim in which the ends of said U strips and the transparent material are bound together.

3. In an open topped packing basket having provision for partial display of its contents, the combination of a collapsible soft metal rim, a supporting frame consisting of a plurality of strips, bent into a U shape, spaced apart to provide openings, and with the ends of said strips gripped by said rim, and a transparent material applied to the bottom and sides of said frame, the material having its upper extremities bent over the ends of said strips before the latter are secured within the rim.

4. An open topped sloping walled container with windows in its walls and bottom comprising two frame sections each consisting of a plurality of U shaped strips, spaced apart longitudinally to provide long narrow openings and having secured on top of each parallel group of said strips a tough transparent material so that when said frame sections are overlaid on each other with the strips running at right angles they provide a supporting body partially of strips and partially of transparent material, means for securing said overlaid sections to each other and a soft metal binding rim in which the ends of said U strips and the transparent material are bound together whereby supporting stresses may be distributed between the bottom and side walls.

5. An open topped sloping walled container with windows in its walls and bottom comprising two frame sections each consisting of a plurality of U shaped strips, spaced apart longitudinally to provide long narrow openings and having secured on top of each parallel group of said strips a tough transparent material so that when said frame sections are overlaid on each other with the strips running at right angles they provide a supporting body partially of strips and partially of transparent material, means for securing said overlaid sections to each other and a soft metal binding rim of larger outside dimension than said overlaid sections and in which the ends of said U strips and the transparent material are bound together whereby when one filled container is placed on top of another the supoprting stresses may be distributed between the bottom and side walls.

SHIRRELL WATSON GRAVES.